United States Patent
Piatek et al.

(10) Patent No.: US 11,282,241 B2
(45) Date of Patent: Mar. 22, 2022

(54) METHOD FOR SIMULATING A DIGITAL IMAGING DEVICE

(71) Applicant: APTIV TECHNOLOGIES LIMITED, St. Michael (BB)

(72) Inventors: Marcin Piatek, Cracow (PL); Michal Jasinski, Osiek (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/813,833

(22) Filed: Mar. 10, 2020

(65) Prior Publication Data
US 2020/0294279 A1 Sep. 17, 2020

(30) Foreign Application Priority Data
Mar. 15, 2019 (EP) ...................................... 19163209

(51) Int. Cl.
*G06T 11/00* (2006.01)
*H04N 9/04* (2006.01)

(52) U.S. Cl.
CPC .......... *G06T 11/001* (2013.01); *H04N 9/0455* (2018.08); *H04N 9/04551* (2018.08); *H04N 9/04555* (2018.08); *H04N 9/04557* (2018.08)

(58) Field of Classification Search
None
See application file for complete search history.

(56) References Cited

U.S. PATENT DOCUMENTS

| 4,249,203 A | * | 2/1981 | Yamanaka | ........... | H04N 9/0451 |
| | | | | | 348/264 |
| 6,774,909 B1 | * | 8/2004 | Nishio | ................... | G09G 5/028 |
| | | | | | 345/593 |

(Continued)

FOREIGN PATENT DOCUMENTS

| CN | 105431895 A | 3/2016 |
| CN | 106715645 A | 5/2017 |

(Continued)

OTHER PUBLICATIONS

Vora, et al., Image Capture: Simulation of Sensor Responses from Hyperspectral Images, IEEE Transactions on Image Processing, IEEE Service Center, Piscataway, NJ, US, vol. 10, No. 2, Feb. 1, 2001, XP011025741, ISSN: 1057-7149.

(Continued)

*Primary Examiner* — Steven Z Elbinger
(74) *Attorney, Agent, or Firm* — Carlson, Gaskey & Olds, P.C.

(57) ABSTRACT

A computer implemented method simulates a digital imaging device capturing a scene. The imaging device includes a color filter array and an output channel for each primary color of the color filter array. The method includes providing an image of the scene containing pixel data for a pixel of the digital imaging device, the pixel data being specified in an input color space, wherein reference color stimuli of the input color space differ from the primary colors of the color filter array of the digital imaging device, determining a luminance value of the pixel data, assigning at least one spectral color to the pixel data, calculating a color dependent output value of the pixel data for each output channel, and providing the calculated output values of the pixel data as output data of the pixel of the imaging device.

18 Claims, 5 Drawing Sheets

(56) References Cited

U.S. PATENT DOCUMENTS

| | | | | |
|---|---|---|---|---|
| 2008/0013827 A1* | 1/2008 | Cordes | ................. | H04N 1/6058 |
| | | | | 382/167 |
| 2008/0170794 A1* | 7/2008 | Sano | ..................... | H04N 1/646 |
| | | | | 382/232 |
| 2009/0040371 A1* | 2/2009 | Hunter | ................. | H04N 5/3572 |
| | | | | 348/425.1 |
| 2009/0201309 A1* | 8/2009 | Demos | ..................... | G01J 3/50 |
| | | | | 345/589 |
| 2010/0303344 A1* | 12/2010 | Sato | .................. | H04N 9/04557 |
| | | | | 382/162 |
| 2012/0307116 A1* | 12/2012 | Lansel | .................. | H04N 9/045 |
| | | | | 348/273 |
| 2015/0009229 A1* | 1/2015 | Ji | ............................ | G09G 5/02 |
| | | | | 345/601 |
| 2018/0130928 A1* | 5/2018 | Vick | ..................... | H01L 33/502 |
| 2020/0135030 A1* | 4/2020 | Krivokon | ........... | G06K 9/00798 |

FOREIGN PATENT DOCUMENTS

| | | | | |
|---|---|---|---|---|
| CN | 109413415 A | 3/2019 | | |
| WO | 2013/101639 A1 | 7/2013 | | |
| WO | WO-2013101639 A1 * | 7/2013 | ............... | H04N 1/60 |

OTHER PUBLICATIONS

Extended European Search Report for Application No. EP 19 16 3209 dated Aug. 29, 2019.

Office Action for CN Application No. 202010563220, dated Sep. 2, 2021.

English translation of Office Action for CN Application No. 202010563220, dated Sep. 2, 2021.

\* cited by examiner

Fig.5

METHOD FOR SIMULATING A DIGITAL IMAGING DEVICE

CROSS REFERENCE TO RELATED APPLICATION

This application claims priority to European Patent Application No. 19163209.0, filed on Mar. 15, 2019.

FIELD

The present disclosure relates to a computer implemented method for simulating a digital imaging device.

BACKGROUND

Digital imaging devices, such as digital cameras, are used in automotive applications to capture the environment surrounding a vehicle. Output data of such imaging devices are usually fed to image analysis devices to extract information on the captured scene such as positions and/or trajectories of other vehicles, road signs or the like. These image analysis devices may be part of assistance systems that at least partly control the vehicle based on the information extracted from the image provided by the imaging device, such as advanced driver assistance systems (ADAS).

Algorithms for said image analysis devices are more and more widely designed and/or validated using simulation systems that simulate the environment surrounding the vehicle and provide image data representing the field of view captured by the imaging device. The algorithms may be tested by providing the image data as input to the algorithm and analyzing the information extracted from the image data by the algorithm. Since the analyzed image has been generated by simulation system, it is possible to automatically verify the information extracted by the algorithm by comparing it with additional information used to generate the image.

For accurate testing, the image data provided by the simulation system should match the output that the imaging device would deliver when capturing the simulated scene as closely as possible. Furthermore, in order to test the algorithms in real-time conditions, the image data should be provided with a rate that corresponds to the output data rate of the real imaging device, for example a streaming rate of an imaging device configured as video camera.

Accordingly, there is a need to accurately and efficiently reproduce the output of a digital imaging device based on given image data representing a scene to be captured by the imaging device.

SUMMARY

In one aspect, the present disclosure is directed at a computer implemented method for simulating a digital imaging device capturing a scene, the imaging device comprising a color filter array and an output channel for at least one or for each primary color of the color filter array, wherein the imaging device is described by a model comprising an input channel and a spectral sensitivity for each output channel of the digital imaging device. The method includes:

providing an image of the scene containing pixel data for a pixel of the digital imaging device via the input channel, the pixel data being specified in an input color space, wherein reference color stimuli of the input color space differ from the primary colors of the color filter array of the digital imaging device, determining a luminance value of the pixel data, assigning at least one spectral color to the pixel data, calculating a color dependent output value of the pixel data for each output channel, wherein the color dependent output value for each output channel depends on: the spectral sensitivity of the respective output channel evaluated at the at least one spectral color assigned to the pixel data; and the luminance value of the pixel data, and providing the calculated output values of the pixel data as output data of the pixel of the imaging device.

The image is provided as a digital image and may be a simulated image that has been simulated by a vehicle simulation system. The provided image represents the field of view of the imaging device that would result when using the camera for capturing the scene in reality. The method allows converting the pixel data of the image representing the scene from the input color space to an output color space of the imaging device that is given by the primary colors of the color filter array of the camera. The output color space constitutes the color space in which the camera is outputting the output data in reality. This conversion has the technical effect that the output data calculated from the image provided as input closely match image data that would be produced by the imaging device when capturing the scene in reality. The calculated output data is furthermore independent of the input color space used to initially provide the image of the scene. Therefore, various sources, especially various vehicle simulation systems, may be used to generate the image and results from testing an image analysis algorithm with the image data do not depend on the particular source used.

Assigning a spectral color to the pixel data and calculating the output values of the pixel data based on the spectral sensitivities of the imaging device at the assigned spectral color has the technical effect that it is possible to accurately and efficiently reproduce nonlinearities in the color perception of the imaging device, since these nonlinearities are encoded in the spectral sensitivities and the spectral sensitivities only have to be evaluated at the spectral colors assigned to the pixel data. The computing time that is necessary to implement the method can therefore be kept short. The spectral sensitivities may be stored as tabulated data, so that an evaluation at the spectral color assigned to the pixel data is memory and time efficient. Furthermore, the method may be executed in parallel for several pixels of the imaging device, which further reduces the computing time. Additionally or alternatively, it is possible to perform the calculations of the individual output values of the pixel data at least partly in parallel, once the at least one spectral color has been assigned to the pixel data.

The digital imaging device may be a (real) camera, for example a still camera that produces single images and/or a video camera producing a stream of images at a given frame rate. The imaging device may be adapted for use in automotive applications, for example as a front camera of a vehicle.

The imaging device comprises a digital imaging sensor with individual photosites and the color filter array placed in front of the photosites between the sensor and imaging optics of the imaging device. The color filter array may be a RCCC filter array that comprises a unit cell with one red filter element (R) and four clear (C) filter elements or a RYYCy filter array with a unit cell comprising one red filter element, two yellow (Y) filter element and one cyan filter element (Cy). The model of the digital imaging device comprises an individual spectral sensitivity for each individual color of the color filter array. In the case of a RCCC filter array, the model comprises two spectral sensitivities, one for the red channel associated with the red filter element and one for the clear channel associated with the clear filter elements. In the case of a RYYCy filter array, the model comprises three spectral sensitivities, one for the red channel, one for the yellow channels associated with the yellow filter elements and one for the cyan channel associated with cyan filter element.

The input color space may be, for example, an additive color space, for example a RGB color space, such as a sRGB color space, or the like. In case of a RGB color space, the reference color stimuli of the input color space correspond to red (R), green (G) and blue (B). However, since the color dependent output data are only calculated from the at least one spectral color assigned to the pixel data, the input color space may also be any other color space.

The model may comprise the spectral sensitivities as spectral sensitivity functions or as spectral sensitivity charts with tabulated values. The spectral sensitivities may be evaluated by performing a look-up or a search of a sensitivity value associated with the spectral color assigned to the pixel data. The spectral sensitivities specify the relative amount of light detected by the associated color channel of the imaging device as a function of the color or wavelength of the incident electromagnetic radiation. The spectral sensitivities may be provided as measured spectral sensitivities and the method may comprise a step of measuring the spectral sensitivities of the individual color channels for different input colors. The spectral sensitivities associated with the color channels of the imaging device may be stored in a memory unit of a computer that is configured to implement the method described herein.

The pixel data of the image represent the electromagnetic radiation that the imaging device images on the pixel when capturing the scene. The image may be generated by a simulation system and may constitute output data of the simulation system. The output data may further comprise additional information that specifies the information that an image analysis device processing the image should extract from the image. The image with the associated additional information may, for example, constitute labelled training data for the image analysis device.

The luminance value of the pixel data may be determined by converting the pixel data into an intermediate color space that differs from the input color space and from the color space defined by the output channels of the digital imaging device. The intermediate color space may be, for example, a CIE 1931 XYZ or CIE 1931 xyY color space and the luminance value may then be given by the value of the Y coordinate of the pixel data.

The individual output values of the pixel data may be calculated to be directly proportional to the luminance value of the pixel data and/or to be directly proportional to a sensitivity value obtained by evaluating the corresponding spectral sensitivity at the spectral color assigned to the pixel data. For example, the individual output values may be calculated by multiplying the sensitivity value with the luminance value of the pixel data.

The imaging device may comprise several pixels and the image provided to the input channel may therefore comprise several pixel data. The steps of determining a luminance value of the pixel data, of assigning the at least one spectral color to the pixel data, of calculating the color dependent output values of the pixel data and of providing the calculated output values may be performed for each pixel. The steps performed for the individual pixels may be, at least partially, performed in parallel when implementing the method on a computer.

The method may include the step of converting the output data into a final color space and/or the step of outputting the output data via a user interface, for example via a digital display. The final color space may be the same color space as the input color space. The final color space may be an RGB color space, for example in sRGB color space.

According to an embodiment, the method includes checking, whether the at least one spectral color can be assigned to the pixel data, wherein said step of assigning the at least one spectral color to the pixel data and said step of calculating the color dependent output value for each output channel are performed only if the at least one spectral color can be assigned to the pixel data. If no spectral color can be assigned to the pixel data, the method comprises:

calculating a color independent output value of the pixel data for each output channel, wherein the color independent output values are calculated as being equal, and providing the calculated color independent output values of the pixel data as the output data of the pixel of the imaging device.

The color independent values of the pixel data may be calculated to be directly proportional to the luminance value of the pixel data.

According to an embodiment, it is decided that the at least one spectral color can be assigned to the pixel data if a color locus of the pixel data differs from a grayscale value, and it is decided that no spectral color can be assigned to the pixel data if the color locus of the pixel data corresponds to a grayscale value. For checking, whether the at least one spectral color can be assigned to the pixel data, the method may therefore comprise a step of checking, whether a color locus of the pixel data corresponds to a grayscale value.

If the color locus of the pixel data corresponds to a greyscale value, slight color variations of the pixel data and the color stimulus values representing the pixel data usually result in significant changes of the spectral color assigned to the pixel data.

This reduces the accuracy of the color conversion from the input color space to the output color space represented by the color channels of the imaging device. By assigning the at least one spectral color to the pixel data only if the color locus of the pixel data differs from a greyscale value, it is possible to avoid these inaccuracies.

According to an embodiment, the color locus of the pixel data corresponds to a grayscale value if color stimulus values representing the pixel data in an additive color space, for example in an RGB color space, each exceed a given first threshold and/or a difference between the color stimulus values and a mean value of the color stimulus values, for example between the color stimulus values and a median value of the color stimulus values, is below a second threshold.

The first threshold constitutes an absolute threshold that the color stimulus values of the pixel data have to exceed to be qualified as a greyscale value and the second threshold defines a tolerance for admissible variations between the individual color stimulus values of greyscale values. The first threshold may correspond to more than a quarter or more than a half of a maximum value of the color stimulus values representing the pixel data in the input color space.

The second threshold may correspond to less than a half, less than a quarter or less than a fifth of the maximum value of the color stimulus values.

The RGB color space may be the sRGB color space and the maximum value of the color stimulus values may correspond to 255. The first threshold may then be equal to or larger than 70, equal to or larger than 100 or equal to or larger than 130. The second threshold may be equal to or smaller than 100, equal to or smaller than 70 or equal to or smaller than 50.

According to an embodiment, the method includes:
checking, whether a single dominant spectral color can be assigned to the pixel data,
wherein, if said single dominant spectral color can be assigned to the pixel data, the output values calculated for the individual output channels each depend on the spectral sensitivity of the respective output channel evaluated at only the dominant spectral color.

Therefore, it is only necessary to evaluate the spectral sensitivities of the color channels for one spectral color, namely for the dominant spectral color, and the conversion from the input color space to the output color space of the output channels is computationally simple.

According to an embodiment, checking, whether the single dominant spectral color can be assigned to the pixel data, includes:
checking, whether an extrapolation from a white point of CIE 1931 xyY chromaticity diagram, especially from the D65 white point, through a color locus of the pixel data in the chromaticity diagram intersects the spectral locus of the chromaticity diagram.

If said extrapolation intersects the spectral locus, it is decided that the single dominant spectral color can be assigned to the pixel data and the method comprises:
assigning a spectral color corresponding to the intersection between the extrapolation and the spectral locus to the pixel data as the single dominant spectral color.

The method may include a step of converting the pixel data from the input color space, e.g. the sRGB color space, to CIE 1931 xyY color space, for example prior to checking whether the single dominant spectral color can be assigned to the pixel data. The CIE 1931 xyY forms the intermediate color space used to determine the luminance value and the color locus of the pixel data. Said conversion may be performed by a matrix multiplication of linear sRGB values derived from the pixel data. Checking, whether the extrapolation intersects the spectral locus of the chromaticity diagram may be directly performed by calculating the extrapolation. It may also be performed by checking, whether the color locus of the pixel data is situated outside a region of the chromaticity diagram comprising all color locus for which said extrapolation intersects the purple line of the chromaticity diagram.

According to an embodiment, the method includes checking, whether two spectral colors can be assigned to the pixel data. Furthermore, if said two spectral colors can be assigned to the pixel data, the output values calculated for the individual output channels each depend on the spectral sensitivity of the corresponding output channel evaluated at a first spectral color of the two spectral colors and on the spectral sensitivity of the corresponding output channel evaluated at a second spectral color of the two spectral colors.

Checking, whether two spectral colors can be assigned to the pixel data may be performed by checking, whether the color locus of the pixel data differs from a greyscale value, and/or by checking whether the single dominant spectral color can be assigned to the pixel data. It may then be decided that only two spectral colors can be assigned to the pixel data if the pixel data differ from a greyscale value and/or if no single dominant spectral color can be assigned to the pixel data.

The first spectral color may correspond to a spectral color corresponding to sRGB red and amount to a wavelength of 612.4348 nm. The second color may correspond to a spectral color corresponding to sRGB blue and amount to a wavelength of 449.3598 nm.

According to an embodiment, checking, whether the two spectral colors can be assigned to the pixel data comprises checking, whether an extrapolation from a white point of CIE 1931 xyY chromaticity diagram, especially from the D65 white point, through a color locus of the pixel data in the chromaticity diagram intersects the purple line of the chromaticity diagram. If said extrapolation intersects the purple line, it is decided that the two spectral colors can be assigned to the pixel data and the method comprises: assigning a spectral color corresponding to sRGB red to the pixel data as the first spectral color, and assigning a spectral color corresponding to sRGB blue to the pixel data as the second spectral color.

Checking, whether the extrapolation intersects the purple line may be implemented by checking, whether the color locus of the pixel data is situated inside a region of the chromaticity diagram comprising all color locus for which the extrapolation intersects the purple line of the chromaticity diagram. The x and y chromaticity coordinates of color loci situated inside said region may be stored in a memory unit of a computer system implementing the method and the method may comprise a step of comparing the x and y chromaticity coordinates of the pixel data with the stored coordinates of said color loci situated in said region, for example by interpolation.

According to an embodiment, the output values for the individual output channels each depend on a linear combination of the spectral sensitivity of the corresponding output channel evaluated at the first spectral color and the spectral sensitivity of the corresponding output channel evaluated at the second spectral color. Calculating the output values as said linear combination allows for an efficient calculation. Arguments of the linear combination may be given by the color locus of the pixel data. The arguments may depend from a X chromaticity coordinate and/or a wide chromaticity coordinate in a CIE 1931 xyY chromaticity diagram. The arguments may depend from a position at which the extrapolation from the white point of the chromaticity diagram through the color locus of the pixel data intersects the purple line of the chromaticity diagram. The position may be calculated from both the x chromaticity coordinate and the y chromaticity coordinate of the color locus of the pixel data or, alternatively, only from the x chromaticity coordinate or only from the y chromaticity coordinate.

According to an embodiment, arguments of the linear combination are given by an x chromaticity coordinate value of the color locus of the pixel data in the CIE 1931 xyY chromaticity diagram, especially by sigmoid functions evaluated at the x chromaticity coordinate value of the color locus of the pixel data.

The arguments of the linear combination may therefore be given only by the x chromaticity coordinate and the y chromaticity coordinate may be neglected in calculating the arguments. This allows determining the arguments in a simple and efficient way thus reducing computing time needed for determining the arguments. It has been found that the inaccuracy that is introduced by neglecting the y chromaticity coordinate is negligible since the change of the y chromaticity coordinate of color loci situated along the purple line is small compared to the corresponding change of the x chromaticity coordinate. The use of sigmoid functions guarantees a smooth color transition between the two spectral colors assigned to the pixel data. The sigmoid functions may be logistic functions.

According to an embodiment, if the spectral color can be assigned to the pixel data, the output values for the individual output channels each depend on a measured gain parameter representing a global gain associated with the corresponding output channel of the imaging device.

The gain parameters associated with the individual output channels of the camera may represent intensity variations of the individual color channels that are independent of the wavelength of the incident radiation and are specific to the simulated camera.

The individual gain parameters may be obtained by carrying out a step of recording output signal values of the corresponding color channels of the imaging device when the imaging device is capturing a test scene, a step of generating an image of the test scene in the input color space, for example by recording the test scene with a further camera, the color channels of which having primary colors corresponding to the reference stimulus values of the input color space, a step of performing the method, wherein the image of the test scene is provided via the input channel of the simulation model and a step of comparing the output data generated by performing the method on the image of the test scene with the output signal values generated by the camera. The gain parameters of the individual color channels can then be determined such that the calculated output values of the individual color channels match the corresponding signal value generated by the camera.

According to an embodiment, the measured gain parameters for the individual output channels of the imaging device differ from each other.

According to an embodiment, the color filter array is a RCCC or a RYYCy color filter array.

According to an embodiment, the method includes:
measuring the spectral sensitivity for each output channel of the digital imaging device, and
providing the measured spectral sensitivities by storing them in a memory unit of a computer system configured to implement the method.

The spectral sensitivities are measured with monochromatic electromagnetic radiation impinging on the color filter array of the imaging device. The spectral sensitivities may be measured for electromagnetic radiation with input wavelength values or input colors that cover a predefined range of the electromagnetic spectrum. The measured spectral sensitivities may be stored as tabulated values.

According to an embodiment, the method includes:
obtaining the image of the scene as output data of a virtual simulation of the scene, especially of a traffic scene, as captured by the digital imaging device,
obtaining image information from the calculated output data of the digital imaging device by performing image analysis, such as object recognition, vehicle detection, motion detection or the like, on the calculated output data,
providing the image information as input data for the virtual simulation of the scene.

The image of the scene may be obtained as output data from a vehicle simulation module of a simulation system. The image analysis may be performed by an image analysis module of the simulation system that receives the calculated output data and provides the image information as output data. The simulation system may be configured to adapt the scene according to the image information received as input data. For example, the simulation system may comprise a driving assistance module, for example an advanced driver assistance module, for generating control data for a vehicle. The vehicle simulation module may be configured to simulate the reaction of the vehicle to the control signals generated by the driver assistant module and to adapt the generated images of the scene according to the simulated reaction of the vehicle. For example, the generated images may be adapted to reflect a change of view of the camera when the movement of the vehicle changes in reaction to the control signals, for example by changing direction.

The method may include automatically adapting an analysis algorithm used for obtaining the image information and/or a control algorithm for implementing the driver assistance module. The algorithms may be adapted by feeding back the image information extracted from the output data to the simulation system. Such algorithms may, for example, be configured as artificial neural networks and the images of the scene generated by the simulation system may be used as training data for the artificial neural networks of the algorithms.

The method may include implementing the digital imaging device in a vehicle and connecting the digital imaging device to an image analysis device of the vehicle that is configured to obtain image information from the output data generated by the camera. The image analysis device may be configured to implement the analysis algorithm that has been automatically adapted using the simulation system. The image analysis device may be connected to a driving assistance device of the vehicle that is configured to generate control data based on the image information and to output the control data to the vehicle. The driving assistance device may be configured to implement the control algorithm that has been automatically adapted using the simulation system.

The method may include receiving images as output data from the camera, a step of generating image information from the output data by the image analysis algorithm, a step of generating control data based on the generated image information and a step of outputting the control data to the vehicle.

In another aspect, the present disclosure is directed at a simulation system, said simulation system being configured to carry out several or all steps of the computer implemented method described herein. The simulation system may be configured as a computer system comprising a processing unit, at least one memory unit and at least one non-volatile data storage. The model of the imaging device may be stored in the non-volatile data storage and/or the memory unit. The simulation system may comprise an imaging device simulation module comprising the model of the imaging device and/or the image analysis module and/or the driving assistance module and/or the vehicle simulation module.

In another aspect, the present disclosure is directed at a non-transitory computer readable medium including instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection, for example an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings.

DETAILED DESCRIPTION

Figure 1:
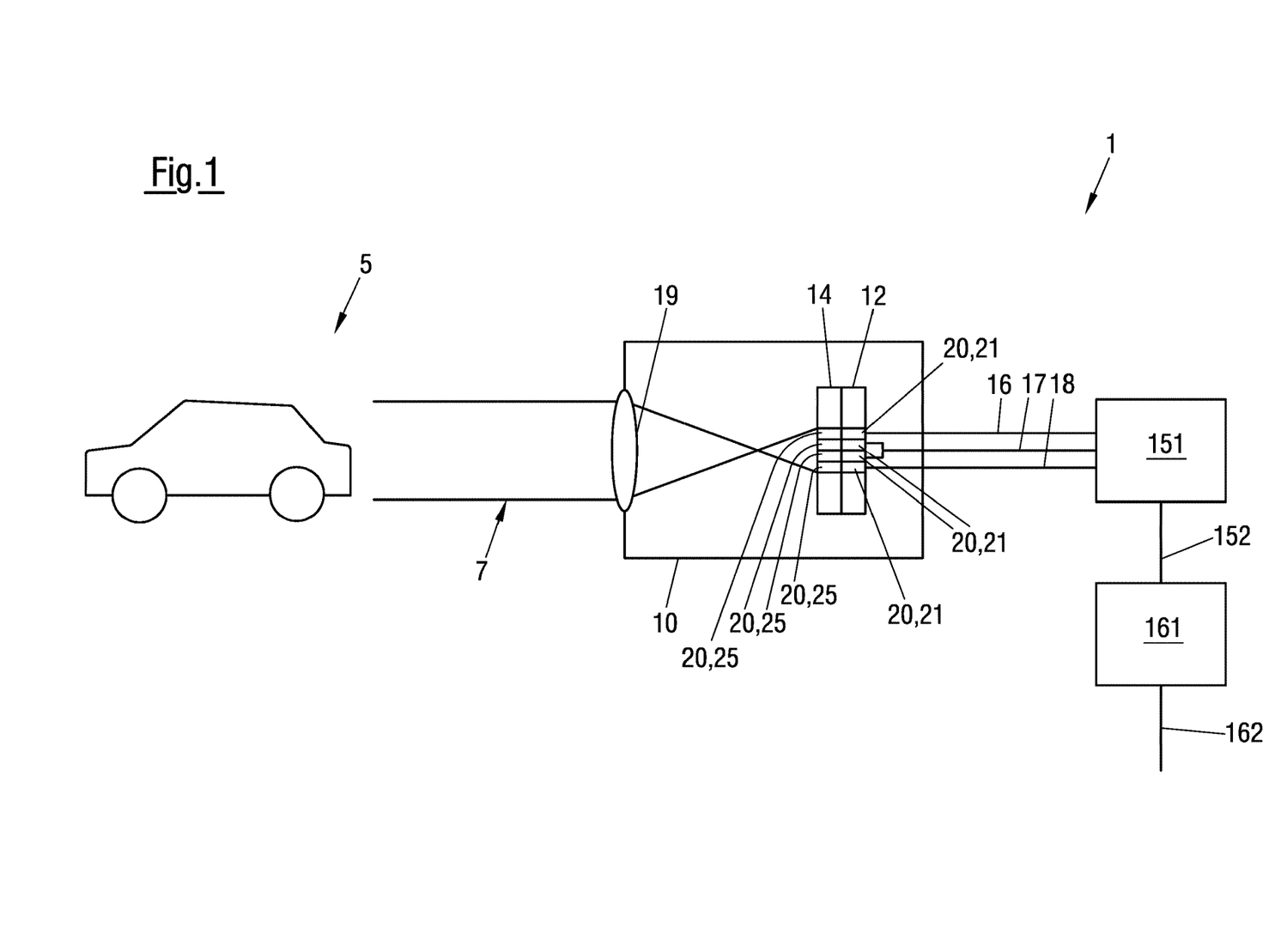
FIG. 1 schematically illustrates a vehicle with an imaging device capturing a traffic scene.

FIG. 1 depicts a vehicle 1 including a digital imaging device 10, an image analysis device 151 connected to the imaging device 10 and a driving assistance device 161 connected to the image analysis device 151. The vehicle 1 may be a car and the imaging device 10 may be a digital camera. The imaging device 10 is configured to image an environment of the vehicle and to capture a traffic scene 5, for example in front of the vehicle 1. Electromagnetic radiation 7 incident from the scene 5 is imaged by imaging optics 19 of the imaging device 10 onto a sensor device of the imaging device 10. The sensor device comprises an imaging sensor 12 and a color filter array 14, wherein the color filter array 14 is arranged between the imaging sensor 12 and the optics 19 of the imaging device 10.

The sensor device includes several logical pixels 20. Each logical pixel 20 comprises several photosites 21 of the imaging sensor 12 and corresponding filter elements 25 of the color filter array 14. The imaging device 10 comprises a separate color channel 16, 17, 18 for each individual primary color of the filter elements 25 associated with the individual pixels 20. The color filter array 14 comprises, for each pixel 20, a first filter element having a first primary color, two second filter elements each having a second primary color and a third filter element having a third primary color. Consequently, the imaging device 10 comprises a first output channel 16 for the first primary color, a second output channel 17 for the second primary color and a third output channel 18 for the third primary color. The color filter array 14 may, for example, be configured as a RYYCy filter array so that the first color corresponds to red, the second color corresponds to yellow and the third color corresponds to cyan.

The imaging device 10 is configured to generate output data comprising an output value for each individual color channel 16, 17, 18, that represent the intensity of the electromagnetic radiation 7 recorded by the photosites 21 associated with the individual color channels 16, 17, 18. The color values are received by the image analysis device 151, which is configured to implement an image analysis algorithm to extract image information 152 from the output data of the imaging device 10 by performing image analysis, such as object recognition, vehicle detection, motion detection or the like. The image information 152 is received by the driving assistance device 161 and the driving assistance device 161 is configured to implement a control algorithm to generate control data 162 used to control the driving behavior of the vehicle 1. The driving assistance device 161 is configured as an advanced driver assistance device.

Figure 2:
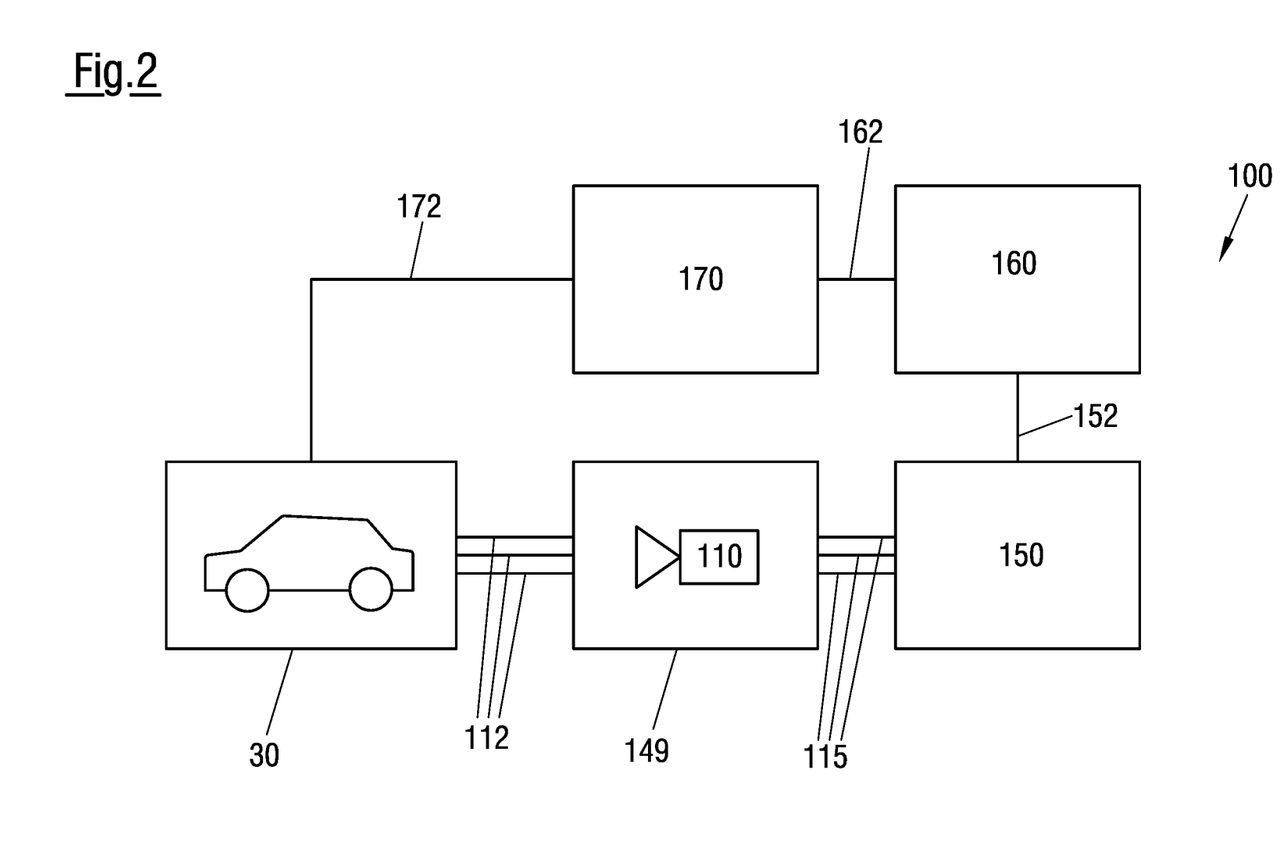
FIG. 2 schematically illustrates simulation system and an imaging device simulation module for simulating the imaging device.

FIG. 2 depicts a simulation system 100 and an imaging device simulation module 149 for developing and evaluating the image analysis algorithm and the control algorithm. The imaging device simulation module 149 is configured to simulate the color perception process of the imaging device 10 and contains a model 110 representing the imaging device 10. The imaging device simulation module 149 and the model 110 comprise an input channel 112 for receiving input data and output channels 115 for providing output data, wherein the output channels 115 correspond to the individual output channels 16, 17, 18 of the digital imaging device 10.

The simulation system 100 includes an image analysis module 150, a driving assistance module 160 and a vehicle simulation module 170. The vehicle simulation module 170 is configured to generate a stream of images 30 that represent the traffic scene 5 to be captured by the simulated digital imaging device 10 as simulation output data 172. Each image 30 is provided in an input color space and fed to the imaging device simulation module 149 via the input channel 112. The output data 115 generated by the imaging device simulation module 149 is fed to the image analysis module 150 that implements the image analysis algorithm and extracts the image information 152 from the output data of the imaging device simulation module 149. The output data 115 is provided in an output color space that corresponds to a color space defined by the primary colors of the color filter array 14.

The image information 152 is received by the driving assistance module 160 that implements the control algorithm and generates the control data 162 for controlling the behavior of the simulated vehicle 10. The control data 162 are fed back to the vehicle simulation module 170, which computes the reaction of the simulated vehicle 1 to the control data 162 and the corresponding change in the images 30 fed to the imaging device simulation module 149.

Figure 3:
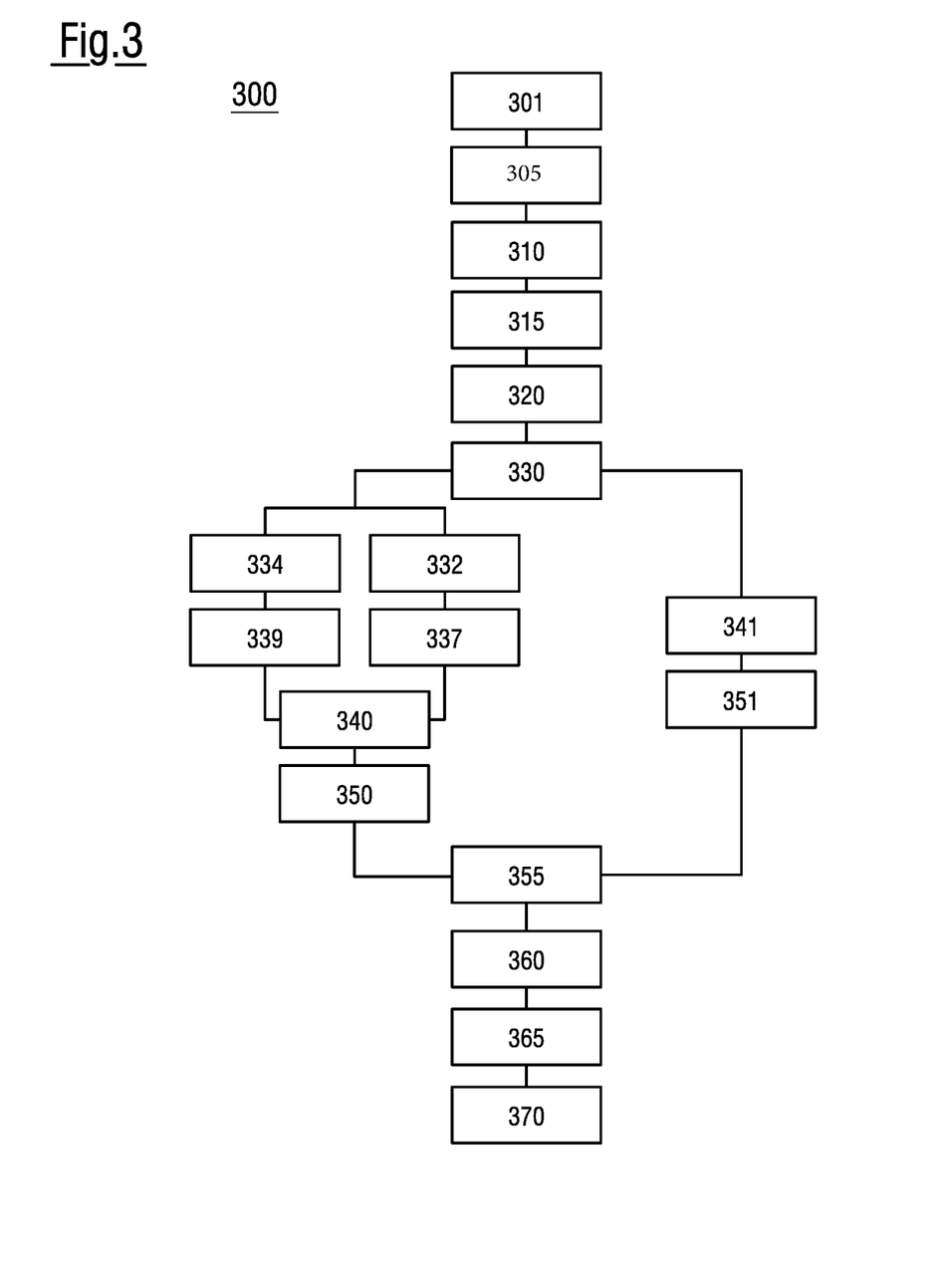
FIG. 3 schematically illustrates a method for simulating a digital imaging device.

FIG. 3 depicts a computer implemented method 300 executed by the simulation system 100 and the imaging device simulation module 149. The method 300 includes a step of measuring 301 a spectral sensitivity for each output channel 16, 17, 18 of the digital imaging device 10. The method 300 further includes a step of obtaining 305 the image 30 as the simulation output data 172 from the vehicle simulation module 170 and a step of providing 310 the image 30 via the input channel 112 to the imaging device simulation module 149. The image 30 is specified in an input color space that is given by sRGB color space, so that individual pixel data of the image 30 each comprise a color stimulus value R for the red channel of the input color space, a color stimulus value B for the blue channel and a color stimulus value G for the green channel of the input color space.

The method 300 includes a step of converting 315 the image 30 from the input color space to an intermediate color space, whereby the intermediate color space is given by CIE 1931 xyY color space. Conversion of the color stimulus values R, G, B of the individual pixel data of the image 30 to the CIE 1931 xyY color space is achieved by a matrix multiplication of linear sRGB values $R_{srgb}$, $G_{srgb}$, $B_{srgb}$ derived from the individual color stimulus values R, G, B, which results in color stimulus values X, Y, Z given by:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{srgb} \\ G_{srgb} \\ B_{srgb} \end{bmatrix}$$

The linear sRGB values $R_{srgb}$, $G_{srgb}$, $B_{srgb}$ are obtained as:

$$C_{linear} = \begin{cases} \dfrac{C_{srgb}}{12.92}, & C_{srgb} \leq 0.04045 \\ \left(\dfrac{C_{srgb} + a}{1+a}\right)^{2.4}, & C_{srgb} > 0.04045 \end{cases}$$

Here, $\alpha=0.055$ and C is either R, G or B with a value between 0 and 1.

Subsequently an x chromaticity coordinate and a y chromaticity coordinate of the pixel data are calculated:

$$x = \frac{X}{X+Y+Z}$$
$$y = \frac{Y}{X+Y+Z}$$

The method 300 further includes a step of determining 320 a luminance value of the pixel data, which is given by the color stimulus value Y of the representation of the pixel data in the CIE 1931 xyY color space.

The method 300 further includes a step of checking 330, whether at least one spectral color can be assigned to the pixel data, by checking whether the color locus of the pixel data corresponds to a greyscale value. It is decided that the color locus corresponds to a greyscale value if each color stimulus value R, G, B of the pixel data exceeds a first threshold amounting to 130 and if differences between the individual color stimulus values R, G, B and the median value of the color stimulus values R, G, B of the pixel data are each below a second threshold amounting to 50, wherein the individual color stimulus values R, G, B range between a minimum value of 0 and a maximum value of 255. If the color locus of the pixel data corresponds to a greyscale value, it is decided that no spectral color can be assigned to the pixel data, otherwise, it is decided that at least one spectral color can be assigned to the pixel data.

If no spectral color can be assigned to the pixel data, the method 300 includes a step of calculating 341 a color independent output value for each color channel 16, 17, 18 of the imaging device 10. The color independent output values are given by $$c_{indep}(i) = g_i * 255 * Y$$

wherein i denotes the individual color channels 16, 17, 18 of the imaging device 10 and $g_i$ each denote a global gain parameter associated with the corresponding color channel 16, 17, 18. Subsequently, the method 300 includes a step of providing 351 the calculated color independent output values $c_{indep}(i)$ of the pixel data as output data 125 of the pixel 20 of the imaging device 10.

Figure 4:
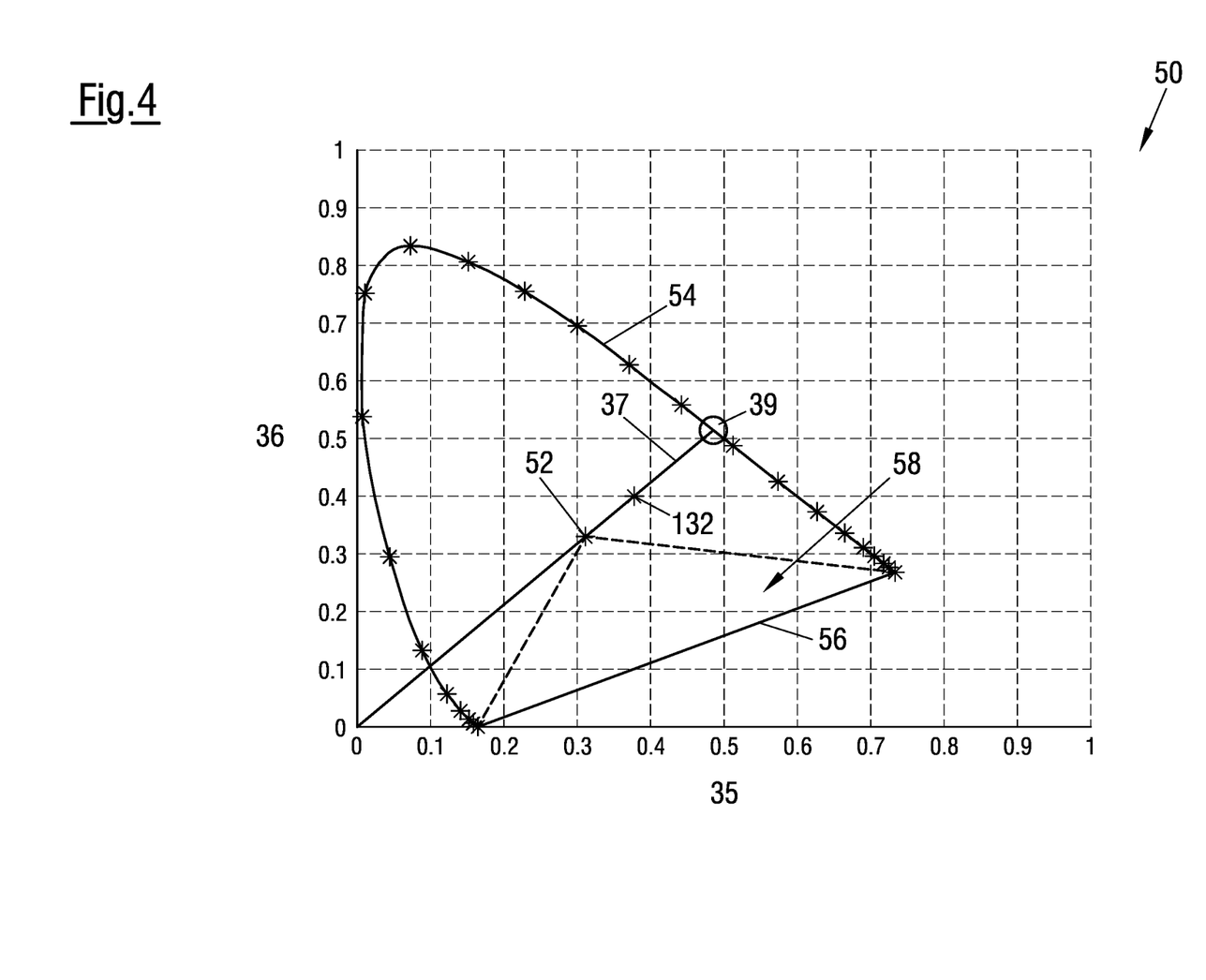
FIG. 4 illustrates a CIE 1931 xyY chromaticity diagram comprising a color locus of pixel data provided to an input channel of the imaging device model.

If the at least one spectral color can be assigned to the pixel data, the method 300 includes a step of checking 332, whether a dominant spectral color can be associated with the pixel data and a step of checking 334, whether two spectral colors can be assigned to the pixel data. As shown in FIG. 4, it is checked in these steps 332, 334 for each pixel data, whether, in a chromaticity diagram 50 that represents the x chromaticity coordinate 35 and the y chromaticity coordinate 36 of the CIE 1931 xyY color space, an extrapolation 37 from a white point 52 of the diagram 50 through a color locus 132 of the pixel data intersects a spectral locus 54 or a purple line 56 of the chromaticity diagram 50. The white point 52 is thereby given by the D65 white point.

The extrapolation 37 intersects the purple line 56 if the color locus 132 of the pixel data lies in a purple region 58 that is bounded by the purple line 56 and straight lines extending between the white point 52 and the ends of the purple line 56. Otherwise, the extrapolation 37 intersects the spectral locus 54 of the chromaticity diagram 50.

If the extrapolation 37 intersects the purple line 56, it is decided that two spectral colors, but no dominant spectral color can be assigned to the pixel data. The method 300 then includes the step of assigning 339 two spectral colors to the pixel data, whereby a first spectral color is given by a spectral color corresponding to sRGB red and a second spectral color is given by a spectral color corresponding to sRGB blue. Consequently, for each output channel 16, 17, 18, the corresponding spectral sensitivity is evaluated at the first spectral color yielding a first spectral sensitivity value and at the second spectral color yielding a second spectral sensitivity value.

If the extrapolation 37 intersects the spectral locus 54, it is decided that the dominant spectral color can be assigned to the pixel data. The method 300 then includes a step of assigning 337 the dominant spectral color to the pixel data. The dominant spectral color is given by chromaticity coordinates of an intersection 39 of the extrapolation 37 with the spectral locus 54. In this case, for each output channel 16, 17, 18, the corresponding spectral sensitivities are evaluated at only the dominant spectral color which yields a dominant spectral sensitivity value for each output channel 16, 17, 18.

The dominant spectral color is therefore assigned to the pixel data by computing a straight line as the extrapolation 37 between the color locus 132 of the pixel data and the white point 52, by finding the intersection 39 of the created line and the spectral locus 54, by obtaining the x chromaticity coordinate value and the y chromaticity coordinate value of the intersection 39 as the chromaticity coordinate values of the dominant spectral color corresponding to the pixel data and by obtaining the wavelength value of the dominant spectral color by its x chromaticity coordinate value and its y chromaticity coordinate value.

The method 300 further includes a step of calculating 340 color dependent output values for the individual output channels 16, 17, 18 of the simulated imaging device 10. If the dominant spectral color can be assigned to the pixel data, the output values of the individual output channels 16, 17, 18 are given by $$c_{depend}(i) = g_i * css_i(\lambda_d) * 255 * Y$$

with $css_i(\lambda_d)$ representing the dominant spectral sensitivity values obtained by the evaluation of the individual spectral sensitivities $css_i(\lambda)$, i=1 . . . 3, at the dominant spectral color $\lambda_d$.

If two spectral colors, but no dominant spectral color can be assigned to the pixel data, the output values of the individual output channels 16, 17, 18 of the simulated imaging device 10 are given by $$c_{depend}(i) = g_i * (css_i(\lambda_{red}) * w_{red}(x) + css_i(\lambda_{blue}) * w_{blue}(x)) * 255 * Y$$

with $\lambda_{red}$=612.4348 and $\lambda_{blue}$=449.3598. The first argument $w_{red}(x)$ and the second argument $w_{blue}(x)$ of the linear combination of the first spectral sensitivity value $css_i(\lambda_{red})$ and the second spectral sensitivity value $css_i(\lambda_{blue})$ are given by a first sigmoid function $w_{red}(x)$ and a second sigmoid function $w_{blue}(x)$, wherein each sigmoid function is evaluated at the x chromaticity coordinate value x of the color locus of the pixel data.

The first sigmoid function is given by the logistic function $$w_{red}(x) = \frac{1}{1 + \exp(c * x + d)}$$

and the second sigmoid function is given by the logistic function $$w_{blue}(x) = \frac{-1}{1 + \exp(c * x + d)} + 1$$

Figure 5:
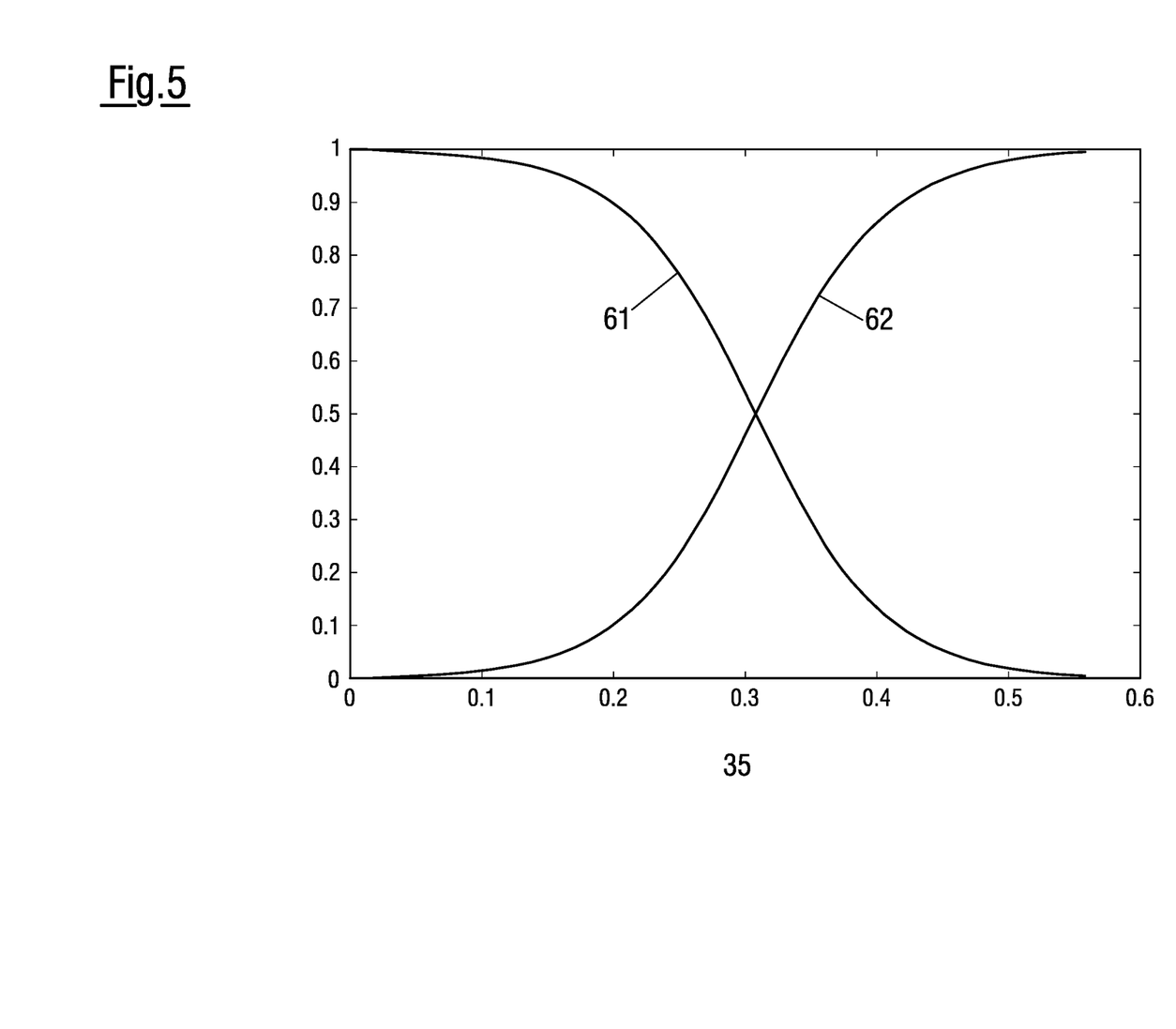
FIG. 5 illustrates a sigmoid functions for determining arguments of a linear combination of spectral colors assigned to the pixel data.

The values c, d may be chosen as c=−20.1821 and d=−0.3083. For these values of c, d, the dependence of the first sigmoid function 61 and the second sigmoid function 62 from the x chromaticity coordinate value 35 are shown in FIG. 5.

As a further step, which is not depicted in FIG. 3, the method 300 may comprise converting the output values of the pixel data to color stimulus values of a visualization color space that is used to display the output data. The visualization color space is again the sRGB color space. The individual color stimulus values $R_{out}$, $G_{out}$, $B_{out}$ of the output data in the visualization color space are calculated as linear combinations of the output values of the output data that have been obtained from the output channels 16, 17, 18. For the output channels 16, 17, 18 of the RYYCy color filter array 14, the color stimulus values $R_{out}$, $G_{out}$, $B_{out}$ of the output data are calculated as:

$$R_{out} = value_{red} * mask_{red} + value_{yellow} * mask_{yellow}$$

$$G_{out} = value_{yellow} * mask_{yellow} + value_{cyan} * mask_{cyan}$$

$$B_{out} = value_{cyan} * mask_{cyan}$$

with $value_{red}$ the output value of the first (red) output channel 16, $value_{yellow}$ the output value of the second (yellow) output channel 17 and $value_{cyan}$ the output value of the third (cyan) output channel 18 and $mask_{red}$, $mask_{yellow}$, $mask_{cyan}$ corresponding logical masks for color conversion.

The method 300 further includes a step of providing 350 the calculated color dependent output values as color dependent output data 125 of the individual pixels 20 of the simulated digital imaging device 10. The method 300 further includes a step of the image analysis module 150 obtaining 355 the image information 152 from the output data 125, a step of providing 360 the image information 152 as input data to the driving assistance module 160 and a step of the driving assistance module 160 generating 365 the control data 162 from the image information 152. Finally, the method 300 includes a step of feeding back 370 the control data 162 to the vehicle simulation module 170.

It is to be understood that all values given herein, e.g. wavelengths or coefficients or other parameters, also encompass deviations from the given numeric value by +/−20%, +/−10%, +/−5% or +/−3%.

It is further understood that the description regarding colored elements, such as the white point 52, the purple line 56, the purple region 58 or the like do not refer to colors in the drawings per se but to colors represented by the individual elements.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A computer implemented method for simulating a digital imaging device capturing a scene,
   the digital imaging device comprising a color filter array and an output channel for each primary color of the color filter array,
   wherein the digital imaging device is described by a model comprising an input channel and a spectral sensitivity for each output channel of the digital imaging device,
   the method comprising:
   providing a simulated image of the scene from a vehicle simulation module, the simulated image containing pixel data for a pixel of the digital imaging device via the input channel, the pixel data being specified in an input color space including reference color stimuli for a red channel, a blue channel and a green channel, wherein the reference color stimuli of the input color space of the simulated image differ from the primary colors of the color filter array of the digital imaging device;
   determining a luminance value of the pixel data;
   assigning at least one spectral color to the pixel data;
   calculating a color dependent output value of the pixel data for each output channel, wherein the color dependent output value for each output channel depends on:
   the spectral sensitivity of the respective output channel evaluated at the at least one spectral color assigned to the pixel data and the luminance value of the pixel data; and
   providing the color dependent output value of the pixel data for each output channel as output data of the pixel of the digital imaging device.

2. The method as claimed in claim 1, comprising:
   checking whether the at least one spectral color can be assigned to the pixel data,
   wherein assigning the at least one spectral color to the pixel data and calculating the color dependent output value for each output channel are performed only if the at least one spectral color can be assigned to the pixel data,
   wherein, if no spectral color can be assigned to the pixel data, the method comprises:
   calculating a color independent output value of the pixel data for each output channel,
   wherein the color independent output values are calculated as being equal, and
   providing the calculated color independent output values of the pixel data as the output data of the pixel of the digital imaging device.

3. The method as claimed in claim 2,
   wherein it is decided that the at least one spectral color can be assigned to the pixel data if a color locus of the pixel data differs from a grayscale value, and wherein it is decided that no spectral color can be assigned to the pixel data if the color locus of the pixel data corresponds to a grayscale value.

4. The method as claimed in claim 3, wherein the color locus of the pixel data corresponds to a grayscale value if color stimulus values representing the pixel data in an additive color space each exceed a given first threshold and/or a difference between the color stimulus values and a mean value of the color stimulus values is below a second threshold.

5. The method as claimed in claim 1, comprising:
checking whether a single dominant spectral color can be assigned to the pixel data,
wherein, if said single dominant spectral color can be assigned to the pixel data, the output values calculated for the individual output channels each depend on the spectral sensitivity of the respective output channel evaluated at only the single dominant spectral color.

6. The method as claimed in claim 5,
wherein checking whether the single dominant spectral color can be assigned to the pixel data, comprises
  checking whether an extrapolation from a white point of a CIE 1931 xyY chromaticity diagram through a color locus of the pixel data in the chromaticity diagram intersects a spectral locus of the chromaticity diagram,
wherein, if said extrapolation intersects the spectral locus, the single dominant spectral color can be assigned to the pixel data and the method comprises
  assigning a spectral color corresponding to the intersection between the extrapolation and the spectral locus to the pixel data as the single dominant spectral color.

7. The method as claimed in claim 1, comprising:
checking whether two spectral colors can be assigned to the pixel data, wherein, if said two spectral colors can be assigned to the pixel data, the output values calculated for the individual output channels each depend on the spectral sensitivity of the corresponding output channel evaluated at a first spectral color of the two spectral colors and on the spectral sensitivity of the corresponding output channel evaluated at a second spectral color of the two spectral colors.

8. The method as claimed in claim 7,
wherein checking whether the two spectral colors can be assigned to the pixel data comprises:
  checking, whether an extrapolation from a white point of a CIE 1931 xyY chromaticity diagram through a color locus of the pixel data in the chromaticity diagram intersects a purple line of the chromaticity diagram,
wherein, if said extrapolation intersects the purple line, the two spectral colors can be assigned to the pixel data and the method comprises:
  assigning a spectral color corresponding to sRGB red to the pixel data as the first spectral color, and
  assigning a spectral color corresponding to sRGB blue to the pixel data as the second spectral color.

9. The method as claimed in claim 8,
wherein the output values for the individual output channels each depend on a linear combination of the spectral sensitivity of the corresponding output channel evaluated at the first spectral color and the spectral sensitivity of the corresponding output channel evaluated at the second spectral color.

10. The method as claimed in claim 9,
wherein arguments of the linear combination are given by an x chromaticity coordinate value of the color locus of the pixel data in the CIE 1931 xyY chromaticity diagram, especially by sigmoid functions evaluated at the x chromaticity coordinate value of the color locus of the pixel data.

11. The method as claimed in claim 1,
wherein, if said at least one spectral color can be assigned to the pixel data, the output values for the individual output channels each depend on a measured gain parameter representing a global gain associated with the corresponding output channel of the digital imaging device.

12. The method as claimed in claim 1, comprising:
measuring the spectral sensitivity for each output channel of the digital imaging device, and
storing the measured spectral sensitivity for each output channel of the digital imaging device in a memory unit of a computer system configured to implement the method.

13. The method as claimed in claim 1, comprising:
obtaining the image of the scene as output data of a virtual simulation of the scene as captured by the digital imaging device.

14. The method as claimed in claim 1, comprising providing the output data of the pixel of the digital imaging device as input data to a driving assistance module of a vehicle.

15. The method as claimed in claim 14, comprising generating control data by the driving assistance module based on the provided input data.

16. The method as claimed in claim 15, comprising feeding back the control data to a vehicle simulation module.

17. A simulation system configured to carry out the computer implemented method of claim 1, the simulation system being configured as a computer system comprising a processing unit and at least one memory unit including the model of the digital imaging device.

18. A non-transitory computer readable medium comprising instructions for carrying out the computer implemented method of claim 1.

* * * * *